2,901,588

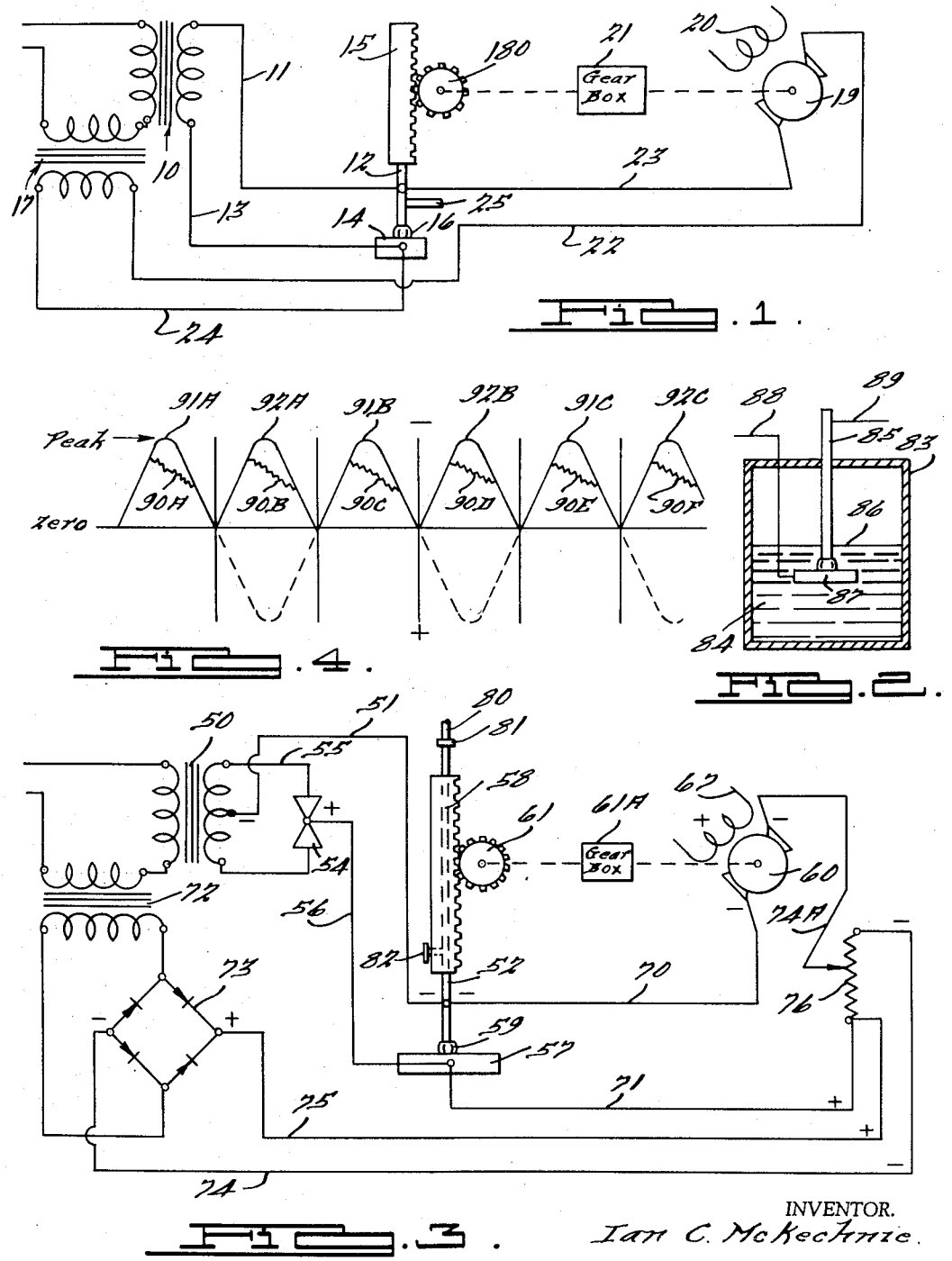
Aug. 25, 1959 — I. C. McKECHNIE — 2,901,588
METHOD AND APPARATUS FOR AUTOMATIC ELECTRIC DISCHARGE MACHINING
Original Filed April 17, 1956
INVENTOR.
Ian C. McKechnie United States Patent Office 2,901,588
Patented Aug. 25, 1959

METHOD AND APPARATUS FOR AUTOMATIC ELECTRIC DISCHARGE MACHINING

Ian C. McKechnie, Detroit, Mich., assignor to Elox Corporation of Michigan, Royal Oak, Mich., a corporation of Michigan Original application April 17, 1956, Serial No. 578,696. Divided and this application June 11, 1958, Serial No. 741,418

6 Claims. (Cl. 219—69)

This invention relates to a method and apparatus for electrical machining of electrically conductive material by means of an electric erosive intermittent discharge across a space between an electrode tool cutter and an electrode workpiece in the presence of a coolant and to a method and apparatus for automatically maintaining the desired space relationship between the electrode tool cutter and the electrode workpiece, and this application constitutes a division of co-pending application Serial No. 578,696, filed April 17, 1956, now abandoned.

A primary object of the invention is to provide a method of and apparatus for automatically maintaining a predetermined spaced relationship or gap between an electrode-tool cutter and an electrode-workpiece across which gap an erosive electrical intermittent discharge takes place to remove material from the workpiece with the gap being automatically maintained and the cutter progressed and controlled as material removal takes place; to provide a method of and apparatus for producing a pulsating electrical potential across the gap which is self-starting to discharge across the gap and which is self-terminating to stop discharging across the gap; and to provide a method of and apparatus for controlling the position of the eletcrodes relative to each other by sensing the average current and/or voltage in the discharge across the gap.

Another object of the invention is to provide a method of and apparatus for automatically maintaining, advancing, and retracting an electrode-tool in spaced relation relative to an electrode-workpiece, or vice versa, or both by providing a force tending to advance at least one electrode toward the other; by providing a force to retract at least the one electrode from the other; by establishing an electrical potential across the space between the electrodes; and by reciprocally regulating spacing between the electrodes by the characteristics of the electrical discharge across the space therebetween on one hand, and regulating the character of the electrical discharge by controlling the spacing between the electrodes on the other hand; in the one instance, by rendering the electrode advancing forces and the electrode retracting forces subject to the influence of the characteristics of the electrical discharge as varied by electrode spacing so as to effect their balance or unbalance in either direction to either hold, advance, or retract at least the one electrode; and, in the other instance, by rendering the characteristics of the electrical discharge across the resistance of the space between the electrodes subject to the resistance of the space as varied by the increased, lessened, or maintained resistance inherent in an increased, lessened, or maintained space dimension across which the discharge takes place in the presence of a medium or lack of medium occupying the space so that optimum discharge-spacing and optimum erosion-discharging is maintained substantially constant as material removal initiates, takes place, progresses, and terminates.

A further object of the invention is to provide an improved automatic power feed for an electric intermittent discharge tool for removing material from electrically conductive workpieces which is more sensitive and more adaptable than those presently in use.

These and other objects of the invention will become more apparent by reference to the following description of the invention taken in connection with the accompanying drawing, in which:

Fig. 1 is an A.C. wiring diagram of an electrical discharge machine tool integrated with voltage and current sensitive means for automatically spacing the electrode tool cutter relative to the electrode workpiece.

Fig. 2 is a schematic showing of an immersion type coolant apparatus for disposing coolant in the space between the cutter and workpiece.

Fig. 3 is a D.C. wiring diagram of an electrical discharge machine tool integrated with current and voltage sensitive means for automatically spacing the electrode tool cutter relative to the electrode workpiece.

Fig. 4 is a diagrammatic showing of self-initiating, self-terminating pulsating and/or intermittent, material removing discharge of the device of Fig. 3, in particular, and Fig. 1, in general.

Referring now to the drawing wherein like numerals refer to like and corresponding parts throughout the several views, the electrical discharge machine tools disclosed therein to illustrate the invention comprise means to advance the electrode tool cutter toward the electrode workpiece, means to retract the electrode tool cutter from the electrode workpiece, means establishing an arc or spark potential between the cutter and the workpiece to form an intermittent arc or spark to remove material from the workpiece, means for disposing a coolant in the arc or spark area, and means so controlling the advancing and retracting means that a desired gap relation is established and maintained between the electrode tool cutter and the electrode workpiece to obtain optimum workpiece material removal.

Fig. 1 illustrates in diagrammatic form an embodiment of the invention wherein alternating current is utilized for eroding the workpiece. A main transformer 10 has its primary connected to an A.C. source and its secondary connected by a lead 11 to an electrode 12 and by a lead 13 to a workpiece 14. The electrode 12 is preferably hollow such that coolant may be passed through it from tube 25, and the workpiece is of conductive material and also functions as an electrode in the circuit.

The electrode 12 is carried by a rack 15, which rack is mounted by means not shown in such manner that it is reciprocable by rotation of the gear 180, the teeth of which are in mesh with the rack teeth.

A second transformer 17 has its primary connected to the A.C. source in series with the primary of transformer 10. The secondary of transformer 17 is connected by means of lead 22 to the armature 19 of an electrical servo-motor, and by lead 24 to the workpiece 14. The other side of the armature 19 is connected by a lead 23 to the electrode 12.

The servo-motor has a field winding 20 adapted to be connected to the A.C. source, and the armature 19 is mechanically connected through a reducing gearbox 21 with the gear 180 such that rotation of the armature in either direction will cause corresponding rotation of the gear 180, but at greatly reduced speed. Inasmuch as the servo-motor, the reduction gearbox, and associated parts are more or less standard items and are commercially obtainable, they have been shown in diagrammatic form to simplify the description.

In order to erode the work 14 by intermittent electrical discharge, it is, of course, necessary to maintain a gap 16 between the electrode and workpiece, and the apparatus herein described provides means for automatically feeding the electrode toward the work until the correct gap relationship is established (as determined by the predetermined gap voltage and current), maintaining the gap relationship during cutting and compensating for wear of the electrode by adjusting the position of same as required.

My automatic servo control is unique in that the gap across which the erosive discharge occurs forms an element of the servo-motor control circuit, and the varying voltage and current across the gap as the electrode approaches and recedes from the workpiece is utilized to control the magnitude and direction of the power flow through the servo-motor armature. The voltage across the gap increases when the electrode recedes and decreases when it approaches, and this variation in voltage is caused to signal the servo control circuit, thereby initiating response by the servo armature to maintain predetermined gap spacing.

It will be seen by tracing the circuit of Fig. 1, that the net voltage applied across the armature 19 is the difference between two voltages, one of which is proportional to the instantaneous difference of potential across the gap 16, and the other of which is proportional to the instantaneous current flowing across the gap during a discharge. Lead 23 connects one side of the armature 19 with the electrode 12. Lead 22 connects the other side of the armature through the secondary of transformer 17 and lead 24 to the workpiece 14, thus subjecting armature 19 to gap voltage. The voltage developed in the secondary winding of transformer 17 is proportional to the current of the discharge across the gap, which current increases with decreased gap length and vice versa. The two voltages are in bucking relation across the armature 19 and thus cause the latter to rotate one way or the other in accordance with the direction of the greater voltage.

In the operation of the apparatus, the voltages are chosen such that when the switch is closed to the machine, the servo armature 19 will rotate to advance the electrode 12 toward the workpiece 14. When the electrode reaches a position such that the dielectric of the gap is broken down by a discharge thereacross, a voltage is developed in the secondary of transformer 17 which is substantially equal to the voltage across the gap when optimum gap length is reached. This then stops rotation of armature 19 or slows it or reverses it in accordance with the relative values of the two voltages.

Because of the gearbox 21, the servo-motor may be a relatively high-speed type with consequent high sensitivity providing almost instant response.

Fig. 3 illustrates an embodiment of the invention wherein D.C. is utilized for eroding the workpiece, D.C. being preferred in most instances because it facilitates better control of dimension and accuracy. In this embodiment, the main transformer 50 has its primary connected to an A.C. source in series with the primary of the secondary transformer 72. The secondary of transformer 50 is connected across a rectifier 54. The positive side of the latter is connected by a lead 56 to the workpiece 57 and by a lead 71 to one side of a potentiometer 76. The negative side of the circuit is connected by a lead 51 to the electrode 52 and by a lead 70 to one side of the servo-motor armature 60.

The secondary of transformer 72 is connected across a rectifier 73. The negative side of the latter is connected by a lead 74 with the upper side of the potentiometer 76 as shown. A lead 74A connects from an adjustable tap of the potentiometer to the other side of the armature 60. The field coil 67 of the servo-motor is connected to a suitable source of D.C. voltage. The positive side of the rectifier 73 is connected by a lead 75 to the same side of potentiometer 76 to which the workpiece 57 is connected.

In the Fig. 3 embodiment, the hollow electrode 52 extends through the rack 58 and is interconnected by means of an adaptor 81 with a tube 80 whereby coolant may be supplied to the gap. The teeth of the rack are meshed with a gear 61 which is driven in either direction of rotation by the armature 60 through the reducing gearing 61A.

By reference to the circuit just described, it will be understood that the secondary of transformer 50 and rectifier 54 supply pulsating D.C. to the gap 59 at predetermined voltage and to the armature 60 through leads 70, 74A, potentiometer 76, and leads 71 and 56. The armature will then be initially rotated to feed the electrode toward the workpiece. The potentiometer 76 is adjusted such that the voltage drop across that portion connected between leads 71 and 74A during discharge across the gap at preselected optimum gap length is the same as the voltage across the gap 59 and of opposite polarity. When the two voltages are in balance, no current will flow through the armature 60 and the electrode 52 will be therefore maintained in optimum position. As erosion of the work takes place, the gap will increase in length and the difference of potential across same will correspondingly increase. Reduced discharge will occur under these circumstances so the current flowing in the primaries of transformers 50 and 72 will fall off and the voltage across potentiometer 76 will be reduced. This unbalancing of the circuit will cause current to flow through the armature 60 through leads 51 and 70 and 74A, potentiometer 76, leads 71 and 56, thereby rotating the armature in a direction feeding the electrode toward the workpiece, and intermittent discharge at optimum gap length will again occur.

It will be readily understood then that the potentiometer 76 may be adjusted by the machine operator to control and select the voltage at which discharge at desired gap length occurs.

If the electrode 52 approaches the work too closely, or if a chip gets between the electrode and work, the gap voltage will be decreased and a higher current will flow across the gap. This will, in turn, cause an increase in current flow in the secondary of transformer 72, thereby increasing the voltage across potentiometer 76 through leads 74 and 75, and the armature will rotate in a direction retracting the electrode until balanced conditions in the circuit are restored.

The conditions of the system are such that cutter-workpiece proximity results in lowered resistance of the gap 59 and permits more current flow in the secondary of transformer 50 resulting in more flow through the primaries of transformers 50 and 72 which raises the voltage across potentiometer 76 simultaneously with reduced voltage across gap 59 whereas cutter-workpiece remoteness results in raised resistance of the gap 59 and more restricted current flow in the secondary of transformer 50 resulting in less flow through the primaries of transformers 50 and 72 which lowers the voltage across the potentiometer 76 and simultaneously increases the voltage across the gap 59. This condition makes the system extremely sensitive to slight changes in disintegrating conditions, rapid in response, and makes the correcting force proportional to the displacement from the normal so that hunting and overrun do not occur. It is to be noted that the motor field 67 is held constant from a separate electrical supply or may be a permanent magnet.

The coolant in the device of Fig. 3 is fed down the hollow electrode tool cutter 52 via a tube 80 and an adaptor 81 and it is to be noted that the electrode extends through and above the rack 58 and that the electrode is fixed relative to the rack 58 by the thumb screw 82. The electrode is insulated from the rack 58 and gears as required.

The immersion coolant disposing means and method of Fig. 2 may be used if desired. It comprises a tank 83, coolant 84, an electrode tool cutter 85 with its discharging portion below the surface 86 of the coolant 84, an electrode workpiece 87 spaced from the electrode tool cutter 85, a power lead 88 connected to the electrode workpiece 87, and a power lead 89 connected to the electrode tool cutter 85. The discharge between the electrode tool cutter 85 and the electrode workpiece 87 is beneath the coolant level 86 so that coolant is gravity fed or head pressure fed into the space between the cutter 85 and the workpiece 87 with the spacing therebetween controlled as hereinbefore described.

The erosive or material removing electrical discharge across the space or gap between the electrode tool cutter and the electrode workpiece is graphically illustrated in Fig. 4 by the zigzag lines 90A to 90F, which arcs or sparks, when the cutter is properly spaced from the workpiece as hereinbefore described, start at a point adjacent the peak of the sine waves 91A, 91B, and 91C and at a point adjacent the peak of the rectified sine waves 92A, 92B and 92C and terminate adjacent the zero or null point of the waves. This full wave rectified circuit is illustrative of the full wave rectified circuit of Fig. 3. Whereas the zigzag lines 90A, 90C and 90E are representative of the circuit of the device of Fig. 1 where alternating current is used. The fact that the cutter, workpiece and space therebetween is kept cool by the coolant eliminates thermionic action between the cutter and workpiece preventing the arcs or sparks 90A to 90F from running together to make a continuous arc or spark discharge. It can now be seen that the discharge can be considered as intermittent.

The D.C. circuits of Figs. 2 and 3 are so polarized relative to the cutter and workpiece that the cutter is always polarized negative during the disintegrating discharge so that the flow of electrons in the discharge is toward the workpiece to remove material from the workpiece rather than from the electrode.

It has been found that heavy discharges remove larger pieces of material from the workpiece and that lighter discharges remove smaller pieces of material from the workpiece thereby giving more accurate control of surface finish and no disturbance to adjacent grain structure and therefore short, light, fast discharges are preferred as their speed enables them to remove as much material as the slower, heavier discharges. Discharges of a duration of a micro-second more or less are preferred. Obviously, the lighter the discharge the closer the electrodes must be located to each other so that the discharges may be self-initiating and terminating.

It is to be understood that various changes may be made in the devices and methods disclosed and described including the size, shape and arrangement of the parts without departing from the spirit of the invention or escaping the scope of the appended claims.

I claim:
1. An electric discharge machining apparatus comprising a source of A.C. E.M.F., a transformer connected to said source of E.M.F., a first rectifier connected to said transformer secondary to polarize the current, an electrode cutter connected to the negative lead from said first rectifier, an electrode workpiece connected to the positive lead from said first rectifier; said cutter being positioned adjacent the workpiece to form a discharge gap, a rack supporting said cutter, a gear engaging said rack, a two-direction servomotor armature connected to said gear so that rotation of said armature in one direction advances said cutter toward the workpiece and rotation of said armature in the opposite direction retracts said cutter from the workpiece; a second transformer interposed in the E.M.F. lead to said first transformer so as to be responsive to the current flowing to said first transformer, a second rectifier connected to said second transformer secondary, a lead connecting the positive sides of said rectifiers in bucking relationship, a negative lead from said cutter to one side of said armature, a negative lead from said second rectifier to the other side of said armature; said negative leads at said armature bucking through said armature of said servomotor so that said armature is rotationally sensitive to balance or unbalance of voltage and current in the leads connected thereto to stand still or to rotate in either direction, and a variable resistance element disposed between said opposed positive leads and said opposed negative leads for controlling the spaced relationships of said electrodes.

2. An electrical servo-mechanism utilizing the energy level of a system controlled for a signal comprising a source of E.M.F., a main transformer powered by said source of E.M.F., an electrode, a work table, a lead from said transformer to said work table, said electrode being adapted to arc to work on said table, an electrical servo-mechanism for controlling electrode-work proximity, an armature for driving said servo-mechanism, a second transformer connected in bucking polarity relation to said main transformer via said work table on one side thereof and connected in bucking polarity relation on the other side thereof via said electrode and said armature so that when the arc potential between said electrode and the work on said table is at the desirable optimum the opposed voltages at said armature are equal and the servo-mechanism maintains the electrode-work relationship and so that when the arc potential is not at the desirable optimum a voltage differential exists across said armature to power same to drive said servo-mechanism in a direction to restore the desirable optimum electrode-work relationship.

3. A servo-mechanism for controlling the power output or energy level of an electric-arc metal-disintegrator system comprising a source of E.M.F., a first transformer connected to said source of E.M.F., a first rectifier connected to said first transformer secondary, an electrode connected to the negative lead of said first rectifier, a positive lead from said first rectifier adapted to be connected to a workpiece to be disintegrated; said electrode being positioned adjacent the work to form an arc-gap, a rack supporting said electrode, a gear engaging said rack, a two-direction servo-motor connected to said gear so that rotation of said motor in one direction advances said electrode toward the workpiece and rotation of said motor in the opposite direction retracts said electrode from the workpiece; a second transformer interposed in the E.M.F. lead to said first transformer so as to be responsive to the current flowing to said first transformer, a second rectifier connected to said second transformer secondary, a lead connecting the positive sides of said rectifiers in opposed polarity relationship, a negative lead from said electrode to one side of said servo-motor, a negative lead from said second rectifier to the other side of said servo-motor opposing said negative lead from said electrode in polarity through the armature of said servo-motor so that said servo-motor is sensitive to voltage balance or unbalance.

4. In a device as set forth in claim 3, a resistor bridging said second rectifier permitting reverse current flow past said second rectifier.

5. A servo-controlled arc-tool comprising an electrode, means for advancing and retracting said electrode relative to a workpiece, an A.C. servo-motor adapted to bi-directionally drive said means, a first source of E.M.F. connected to said electrode and adapted to be connected to a workpiece, a lead from said electrode to one side of said servo-motor, a second source of E.M.F. connected to the other side of said servo-motor and adapted to be connected to a workpiece so that said sources are electrically opposed and communicating across said servo-motor armature with opposed leads at the workpiece and armature having the same polarity at any instant whereby a differential in voltage between the sources of E.M.F. passes current through the armature of said servo-motor causing rotation in the direction of unbalance.

6. In an arc-machining apparatus, an electrode, a workpiece, means mounting said electrode for advancing and retracting movement with respect to said workpiece, means for adjusting the relative positions of the electrode and workpiece including an electrically driven servo-motor, a pair of transformers having their primaries connected in series with the line, means connecting one side of the secondary of the first transformer with the electrode and with one side of the armature of said servo-motor, means connecting the other side of said first secondary with the workpiece and with one side of the secondary of the second transformer, and means connecting the other side of said second secondary with the other side of said armature.

References Cited in the file of this patent

UNITED STATES PATENTS

| | | |
|---|---|---|
| 1,989,546 | Chapman | Jan. 29, 1935 |
| 2,007,751 | Chapman | July 9, 1935 |
| 2,132,474 | Halslag | Oct. 11, 1938 |
| 2,841,686 | Williams | July 1, 1958 |